United States Patent
Kane

(10) Patent No.: US 7,788,184 B2
(45) Date of Patent: Aug. 31, 2010

(54) METHOD FOR PREVENTING IDENTITY THEFT

(76) Inventor: Larry J. Kane, 701 Tama St., Marion, IA (US) 52302

( * ) Notice: Subject to any disclaimer, the term of this patent is extended or adjusted under 35 U.S.C. 154(b) by 933 days.

(21) Appl. No.: 11/162,815

(22) Filed: Sep. 23, 2005

(65) Prior Publication Data

US 2007/0073622 A1   Mar. 29, 2007

(51) Int. Cl.
*G06K 5/00* (2006.01)

(52) U.S. Cl. .......................... 705/75; 235/379; 235/380

(58) Field of Classification Search ................. 235/379, 235/380; 705/59, 75
See application file for complete search history.

(56) References Cited

U.S. PATENT DOCUMENTS

| | | |
|---|---|---|
| 4,109,238 A | 8/1978 | Creekmore |
| 4,187,498 A | 2/1980 | Creekmore |
| 4,321,672 A | 3/1982 | Braun et al. |
| 4,672,377 A | 6/1987 | Murphy et al. |
| 4,816,655 A | 3/1989 | Musyck et al. |
| 4,958,066 A | 9/1990 | Hedgeoth |
| 5,053,607 A | 10/1991 | Carlson et al. |
| 5,119,293 A | 6/1992 | Hammond |
| 5,267,149 A | 11/1993 | Anada et al. |
| 5,341,428 A | 8/1994 | Schatz |
| 5,423,043 A | 6/1995 | Fitzpatrick et al. |
| 5,426,281 A | 6/1995 | Abecassis |
| 5,444,616 A | 8/1995 | Nair et al. |
| 5,570,960 A | 11/1996 | Smith |
| 5,594,226 A * | 1/1997 | Steger ......................... 235/379 |
| 5,667,315 A | 9/1997 | Smith |
| 5,678,937 A | 10/1997 | Smith |
| 5,754,653 A | 5/1998 | Canfeld |
| 5,925,865 A | 7/1999 | Steger |
| 5,987,464 A | 11/1999 | Schneider |
| 6,073,121 A | 6/2000 | Ramzy |
| 6,161,149 A | 12/2000 | Achacoso et al. |
| 6,170,744 B1 * | 1/2001 | Lee et al. ..................... 235/380 |
| 6,193,155 B1 | 2/2001 | Walker et al. |
| 6,237,040 B1 | 5/2001 | Tada |
| 6,250,930 B1 | 6/2001 | Mintz |
| 6,282,523 B1 | 8/2001 | Tedesco et al. |
| 6,321,201 B1 | 11/2001 | Dahl |
| 6,339,767 B1 | 1/2002 | Rivette et al. |
| 6,369,840 B1 | 4/2002 | Barnett et al. |
| 6,390,362 B1 | 5/2002 | Martin |
| 6,499,021 B1 | 12/2002 | Abu-Hakima |
| 6,549,612 B2 | 4/2003 | Gifford et al. |
| 6,556,992 B1 | 4/2003 | Barney et al. |
| 6,592,029 B2 | 7/2003 | Brikho |
| 6,644,546 B2 | 11/2003 | George et al. |
| 6,728,397 B2 | 4/2004 | McNeal |
| 6,912,582 B2 | 6/2005 | Guo et al. |
| 6,938,821 B2 | 9/2005 | Gangi |
| 7,007,068 B2 | 2/2006 | Morkel |
| 7,080,043 B2 * | 7/2006 | Chase et al. ................... 705/59 |
| 7,104,443 B1 | 9/2006 | Paul et al. |

(Continued)

*Primary Examiner*—Evens J Augustin

(57) ABSTRACT

A method of preventing identity theft where a personal document control number is assigned and printed on the document when the document is manufactured. The personal document control number is stored in an electronic file and transmitted to the database of a remote, independent, third party service provider. The document is distributed to a user who presents the document at the point of encashment/presentment and provides the personal document control number. The merchant/acceptor at the point of encashment/presentment contacts the service provider who validates or invalidates the transaction.

4 Claims, 3 Drawing Sheets

U.S. PATENT DOCUMENTS

| | | |
|---|---|---|
| 2001/0034669 A1 | 10/2001 | Tropper |
| 2002/0032738 A1 | 3/2002 | Foulger et al. |
| 2002/0059076 A1 | 5/2002 | Grainger et al. |
| 2002/0072920 A1 | 6/2002 | Grainger |
| 2002/0083093 A1 | 6/2002 | Goodisman et al. |
| 2002/0091635 A1 | 7/2002 | Dilip et al. |
| 2002/0111824 A1 | 8/2002 | Grainger |
| 2002/0138351 A1 | 9/2002 | Houveneer et al. |
| 2002/0138465 A1 | 9/2002 | Lee et al. |
| 2003/0036918 A1 | 2/2003 | Pintsov |
| 2003/0177073 A1* | 9/2003 | Ogai ............ 705/26 |
| 2003/0236728 A1 | 12/2003 | Sunderji et al. |
| 2005/0125358 A1* | 6/2005 | Levin et al. ............ 705/59 |
| 2006/0167754 A1* | 7/2006 | Carro et al. ............ 705/26 |

* cited by examiner

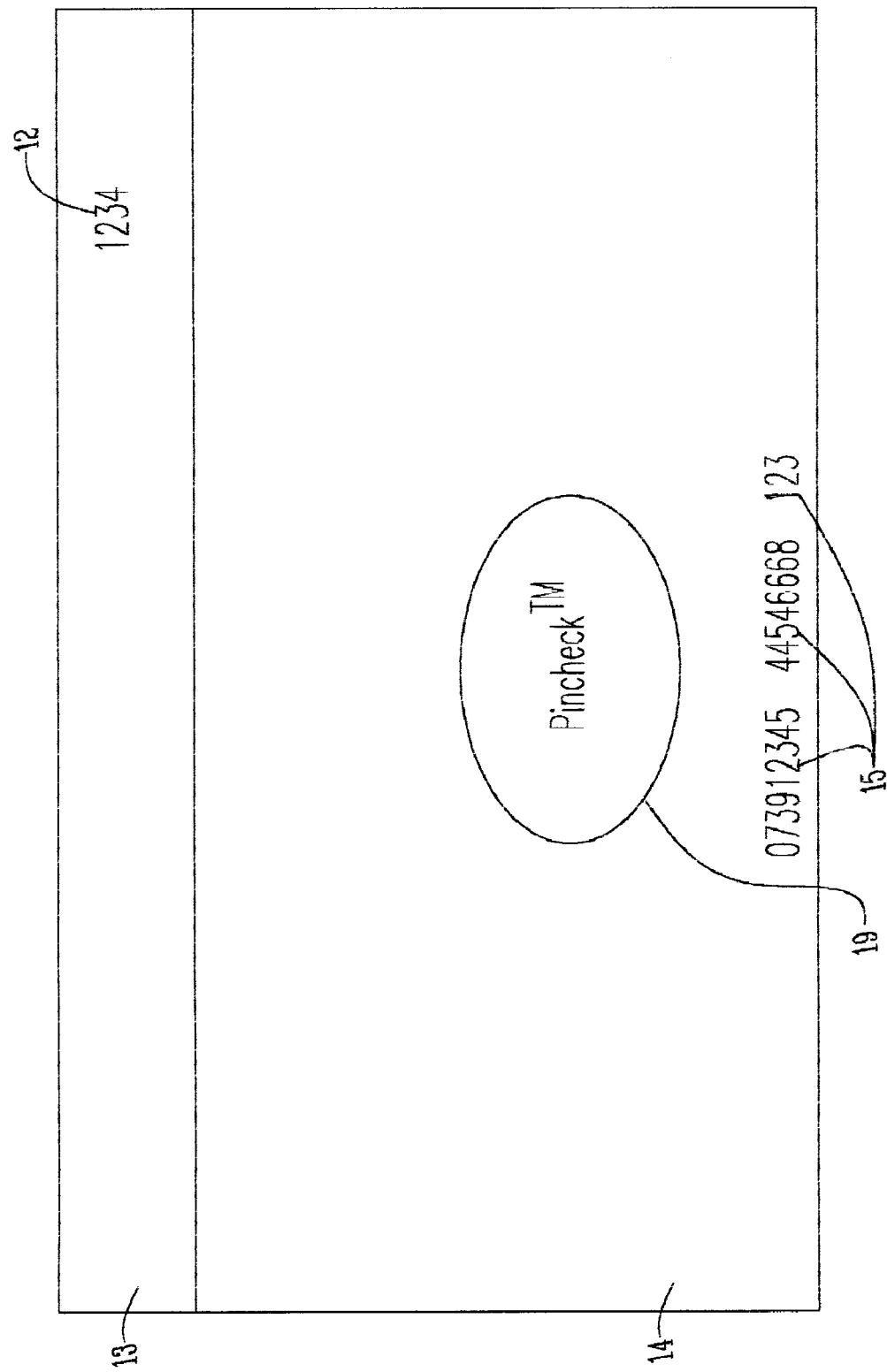

METHOD FOR PREVENTING IDENTITY THEFT

BACKGROUND OF THE INVENTION

This invention is directed toward a method of preventing identity theft and more specifically to a method of preventing theft of corporate documents.

Every year corporate America loses 50 billion to identity theft. Bogus documents such as payroll, accounts payable, cashier's checks, money orders, and other corporate documents are stolen and fraudulently produced. Identity theft is the fastest growing crime in the United States. A thief steals someone's identity every fourteen seconds. When identity theft occurs, the victim suffers financial loss and emotional trauma. Both the financial institution and merchant also suffer losses. As technology has changed, it has become easier for thieves to steal one's identity.

Attempts to solve this problem have not worked. For example, positive pay only protects the commercial check issuer and their bank. Positive pay does not confirm the correct person is presenting the check and does not stop stolen checks from passing through the system. Validation services only indicate whether the checking account is in good standing and does not confirm the identity of the check presenter or authenticity of the document. Finally, biometrics does not prevent identity theft as, for example, a fingerprint does not tie the person to the checking account or the document. Therefore, there is a need in the art for a method that addresses these problems.

An objective of this invention is to provide a method of preventing identity theft that reduces instances of theft.

Another objective is to provide a method of preventing identity theft that ties verification to the document.

These and other objectives will be apparent to those skilled in the art based on the following description.

SUMMARY OF THE INVENTION

A method of preventing identity theft where a personal document control number is assigned and printed on the document when the document is manufactured. The personal document control number is stored in an electronic file and transmitted to the database of a remote, independent, third party service provider. The document is distributed to a user who presents the document at the point of encashment/presentment and provides the personal document control number. The merchant at the point of encashment/presentment contacts the service provider who validates or invalidates the transaction.

DESCRIPTION OF THE DRAWINGS

FIG. 3 is a plan view of a document used in a method for preventing identity theft.

DETAILED DESCRIPTION OF THE PREFERRED EMBODIMENT

Figure 1:
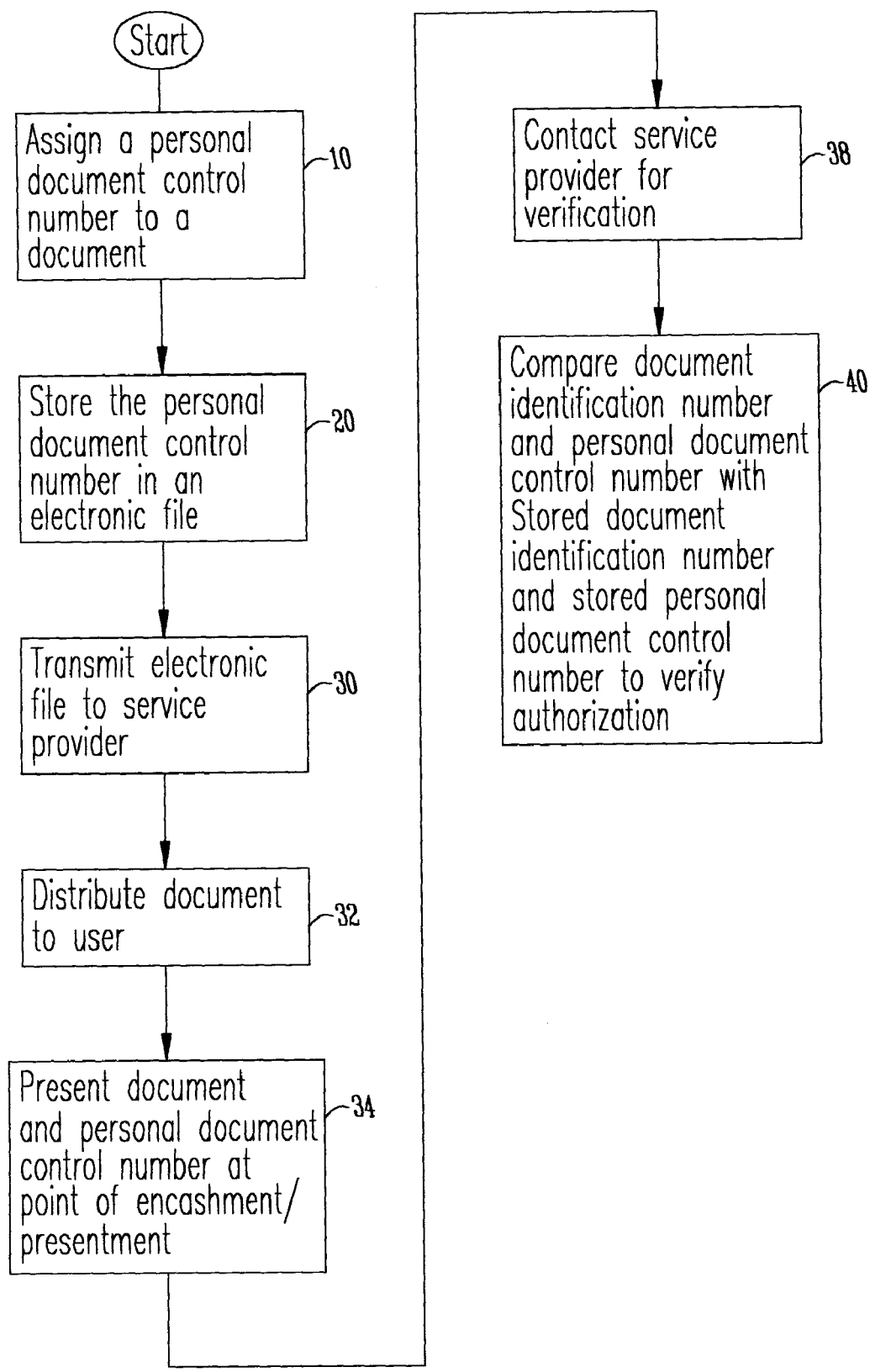
FIG. 1 is a flow chart illustrating a method of preventing identity theft.
Figure 2:
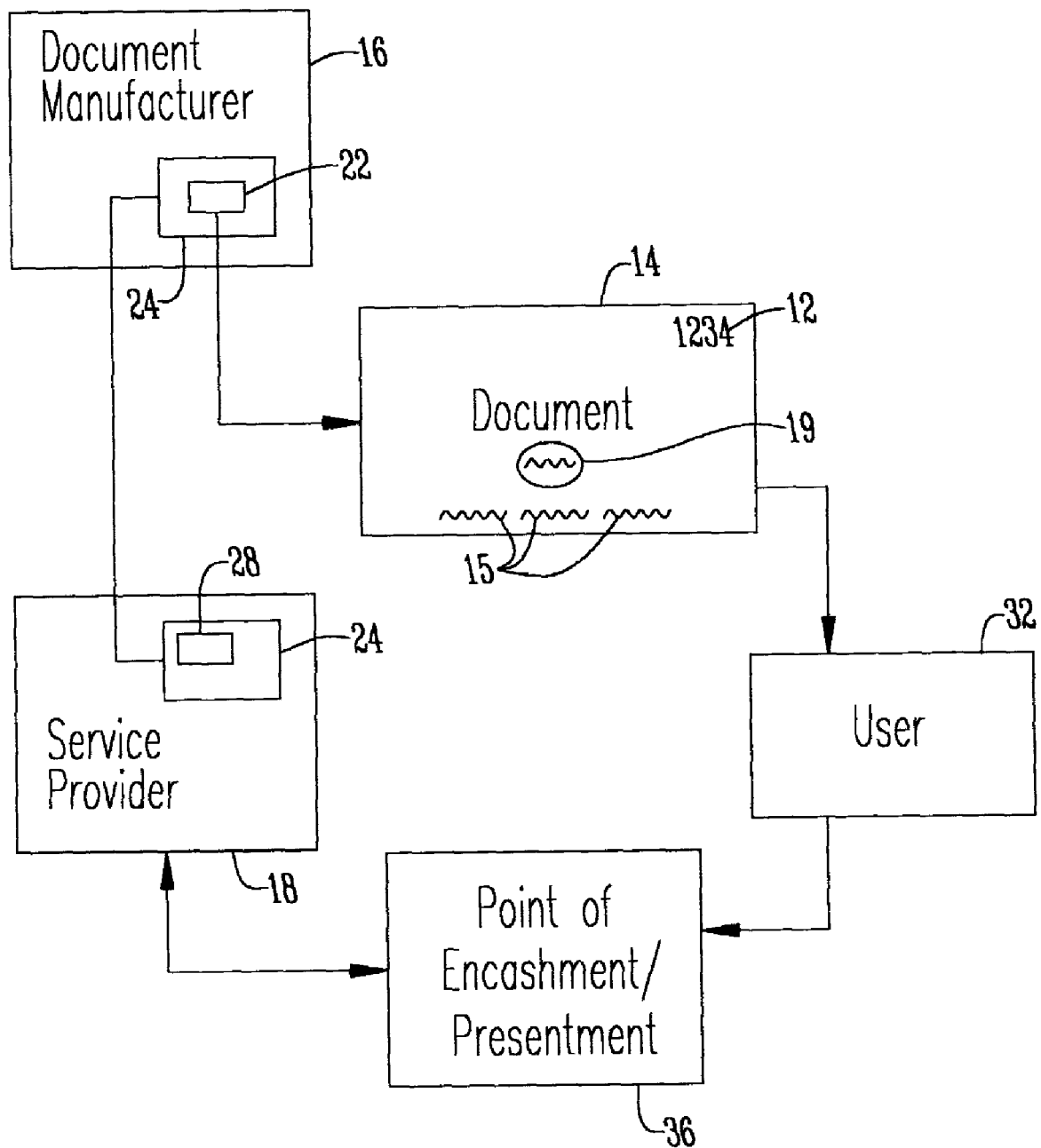
FIG. 2 is a schematic diagram illustrating an operating environment for a method of preventing identity theft.

The method of preventing identity theft begins at step 10 during the manufacturing process where a personal document control number 12 (PDC) is assigned and printed on the document 14, preferably, in the advice portion 13 of the document 14. The document 14 is of any type such as a payroll check, cashier's check, traveler's check, money order, gift certificate, certificate of title or the like and contains document identification information 15. Preferably, documents having PDC numbers 12 are only printed by document manufacturers 16 who have been licensed by a remote, independent, third party service provider 18. Indicia 19, such as seal and/or a watermark are preferably printed on the document to serve as notification and warning that the document is a controlled document 14.

At step 20 the PDC number 12 and document identification information 15 are stored in an electronic file 22 within any conventional control unit 24. At step 26, the electronic file is transmitted by conventional means to the database 28 maintained within any conventional control unit 24 controlled by the service provider 18.

Once transmitted, at step 30, the document 14 is distributed to the user 32. At step 34, the user 32 presents the document 14 at a point of encashment 36 which could be a merchant, financial institution, or the like. When presenting the document 14, the user also provides the PDC number 12 which indicates that the user is authorized to cash the document.

At step 38, the merchant or financial institution 36 contacts the service provider 18 for verification. The service provider 18 is contacted by any conventional means such as by calling the service provider's 18 integrated voice response unit and entering the document information 15 and PDC number 12. The service provider compares the document information 15 with the PDC number 12 and advises the point of encashment 36 whether the user 32 presenting the document 14 is authorized to cash the document at step 40.

Thus, a method for preventing identity theft has been shown and at least all of the stated objectives have been met.

What is claimed is:

1. A method of preventing identity theft, comprising the steps of:
   assigning document identification information and a personal control document number to a document;
   transmitting the document identification information and the personal control document number over an electronic network to a database controlled by a service provider;
   presenting the document and the personal document control number at a point of encashment; and
   contacting the service provider to verify that the personal document control number and the document identification number presented match the transmitted information in the service provider database.

2. The method of claim 1 wherein the personal control document number is assigned by a licensed document manufacturer.

3. The method of claim 1 further comprising the step of printing the personal document control number on an advice portion of the document.

4. The method of claim 1 further comprising the step of printing an indicium on the document.

\* \* \* \* \*